(12) United States Patent
Ström

(10) Patent No.: US 10,544,062 B2
(45) Date of Patent: Jan. 28, 2020

(54) MOLYBDENUM SILICIDE BASED COMPOSITION

(71) Applicant: Sandvik Intellectual Property AB, Sandviken (SE)

(72) Inventor: Erik Ström, Västerås (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 16/064,010

(22) PCT Filed: Dec. 19, 2016

(86) PCT No.: PCT/EP2016/081752
§ 371 (c)(1),
(2) Date: Jun. 20, 2018

(87) PCT Pub. No.: WO2017/108694
PCT Pub. Date: Jun. 29, 2017

(65) Prior Publication Data
US 2019/0002355 A1    Jan. 3, 2019

(30) Foreign Application Priority Data

Dec. 21, 2015 (EP) ..................................... 15201647

(51) Int. Cl.
*C04B 35/58* (2006.01)
*H05B 3/14* (2006.01)
*C04B 35/64* (2006.01)

(52) U.S. Cl.
CPC ........ *C04B 35/58092* (2013.01); *C04B 35/64* (2013.01); *H05B 3/141* (2013.01); *H05B 3/148* (2013.01); *C04B 2235/3217* (2013.01); *C04B 2235/3241* (2013.01); *C04B 2235/3256* (2013.01); *C04B 2235/349* (2013.01); *C04B 2235/3891* (2013.01); *C04B 2235/6021* (2013.01); *C04B 2235/9669* (2013.01); *C04B 2235/9684* (2013.01); *H05B 2203/018* (2013.01)

(58) Field of Classification Search
CPC .......................... C04B 35/58092; H05B 3/148
See application file for complete search history.

(56) References Cited

U.S. PATENT DOCUMENTS

| 7,166,823 B2 | 1/2007 | Sundberg et al. |
| 2005/0242083 A1* | 11/2005 | Sundberg .......... C04B 35/58092 219/553 |
| 2011/0240911 A1* | 10/2011 | Sundberg .......... C04B 35/58092 252/71 |

FOREIGN PATENT DOCUMENTS

| EP | 1492741 B1 | 1/2005 |
| EP | 1710217 A1 | 10/2006 |

(Continued)

OTHER PUBLICATIONS

Strom et al, "low Temperature Oxidation of Cr-alloyed MoSi2" Transactions of Nonferrous Metals Sociey of China, 2007:17(16) 1282-1286. (Year: 2007).*

(Continued)

*Primary Examiner* — Karl E Group
(74) *Attorney, Agent, or Firm* — Morgan, Lewis & Bockius LLP

(57) ABSTRACT

The present disclosure relates to a molybdenum silicide based composition comprising aluminum oxide ($Al_2O_3$) and to the use thereof in high temperature applications.

15 Claims, 1 Drawing Sheet

(56) References Cited

FOREIGN PATENT DOCUMENTS

WO       03/087015 A1    10/2003
WO    2010/047654 A1    4/2010

OTHER PUBLICATIONS

International Search Report and Written Opinion dated May 19, 2017, issued in International Application No. PCT/EP2016/081752.

\* cited by examiner

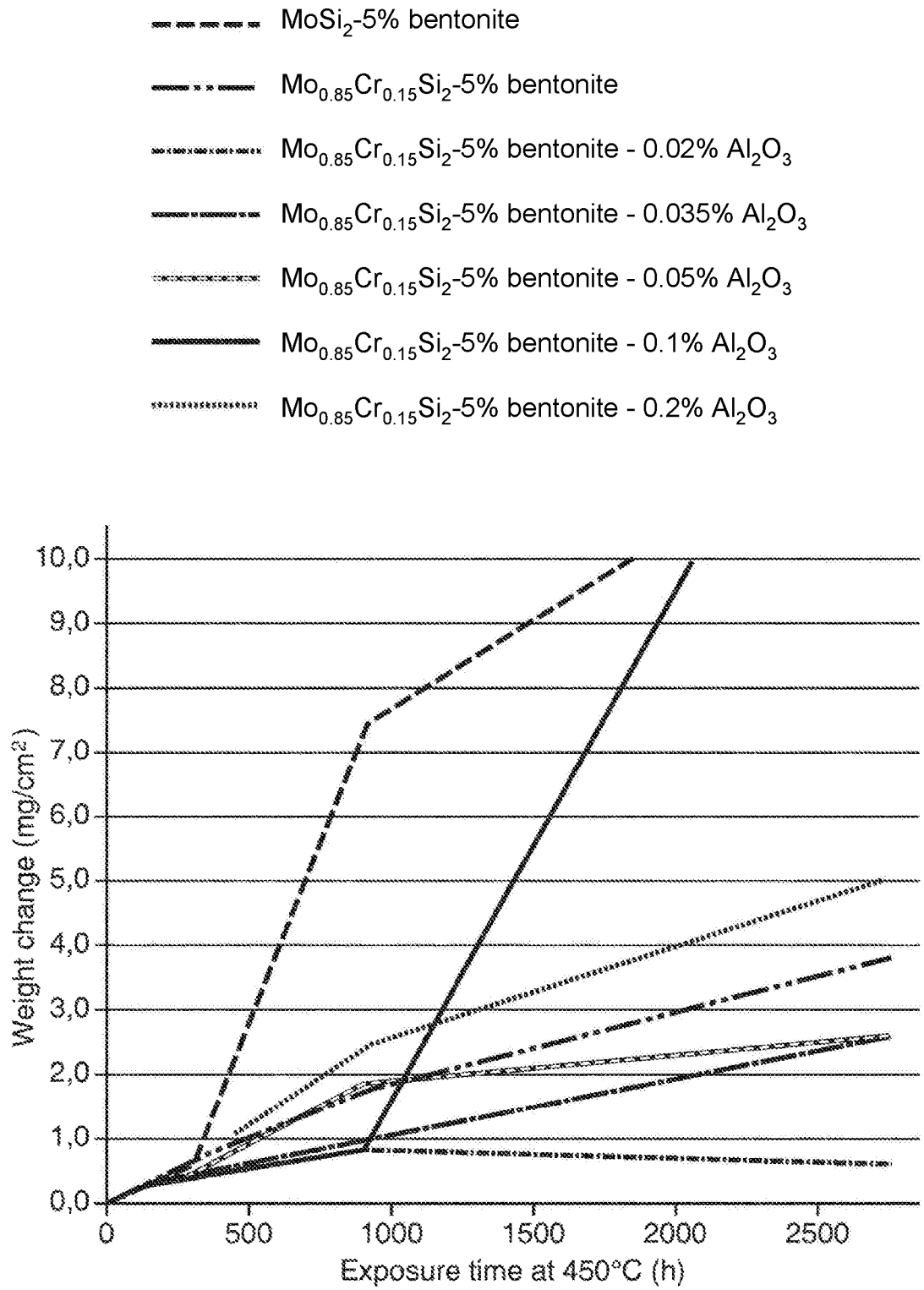

MOLYBDENUM SILICIDE BASED COMPOSITION

TECHNICAL FIELD

The present disclosure relates to a molybdenum silicide based composition comprising aluminum oxide ($Al_2O_3$) and to the use thereof in high temperature applications.

BACKGROUND

Molybdenum silicide ($MoSi_2$) based materials are well known for high temperature furnaces applications. Heating elements made of these materials show good performance at high temperatures, such as above 1800° C., in air because of the formation of a protective silicon dioxide (silica) layer.

When heating molybdenum silicide based materials in air, both the molybdenum and the silicon will be oxidized. The molybdenum oxide will become volatile and evaporate and the silicon will form an oxide layer on the material, which will prevent the material from corrosion and other wear degradations. However, at low temperatures, the molybdenum oxide will remain in the surface layer and will therefore disturb the formation of a continuous silicon dioxide layer. This may lead to a continuous consumption of the material ($MoSi_2$) of the heating element. This phenomenon is called "pesting" or "pest".

It has been shown that chromium-additions to heating elements comprising $MoSi_2$ will reduce the degradation of the heating material at 450° C. It has also been indicated that formation of chromium molybdate will slow down the material consumption in heating elements comprising chromium alloyed $MoSi_2$.

Even though all this progress made for heating elements based on $MoSi_2$, there exists still a problem, especially in industrial furnaces, with the degradation of $MoSi_2$ based heating element. In industrial furnaces, there will be different temperature zones, in general zones having high temperatures and zones having low temperature. Thus, the $MoSi_2$ based heating elements contained therein will also have different temperature zones. In the high temperature zones, there will be no problem with pesting as the silica is formed immediately. However, in the low temperature zones, there will be problems with pesting, which means that these parts of the $MoSi_2$ based heating element will be exposed to corrosion etc., which eventually will lead to heating element failure. Another problem associated with pesting is that when the heating element fails, parts of the surface oxide may fall into the furnace and contaminate the material being heated.

The aim of the present disclosure is to eliminate or at least reduce the above-mentioned problems.

SUMMARY

Hence, the present disclosure therefore provides a molybdenum-silicide based composition comprising: $Al_2O_3$ and 1 to 7 weight % (wt %) bentonite and balance $Mo_{1-x}Cr_xSi_2$ and wherein x is 0.05-0.25, characterized in that $Al_2O_3$ is present in the amount of from 0.01 to 0.06 weight % (wt %) as it surprisingly has been found that small additions of aluminium oxide ($Al_2O_3$) will result in a molybdenum-silicide based composition having excellent resistance against pest.

The present disclosure also provides a heating element comprising a sintered molybdenum silicide based compound which has been manufactured from the molybdenum silicide based composition as defined hereinabove or hereinafter and a furnace comprising an object containing a sintered molybdenum silicide based compound which has been manufactured from the molybdenum silicide based composition as defined hereinabove or hereinafter. Thus, these heating elements will have improved resistance against pest and will also have improved life time which in turn will result in lower maintenance cost.

BRIEF DESCRIPTION OF THE DRAWING

The accompanying FIGURE is a graph showing resistance against pest for different molybdenum silicide compositions.

DETAILED DESCRIPTION

The present disclosure presents a molybdenum-silicide based composition comprising: $Al_2O_3$ and 1 to 7 wt % bentonite and balance $Mo_{1-x}Cr_xSi_2$ and wherein x is 0.05-0.25 and $Al_2O_3$ is present in the amount of from 0.01 to 0.06 wt %.

Bentonite is an aluminum silicate clay consisting mainly of montmorillonite. There are different types of bentonite and they are each named after the respective dominant element. For industrial purposes, two main classes of bentonite exist: sodium and calcium bentonite. Thus, in the present disclosure, the term "bentonite" is intended to include all types of aluminum silicate, such as sodium and calcium bentonite. Bentonite is added to the molybdenum-silicide based composition in an amount of from 1 to 7 weight % (wt %) in order to improve the workability of the composition and enable the manufacture of heating elements through e.g. extrusion. According to one embodiment, bentonite is present in the amount of from 2 to 6 wt %, such as of from 2 to 5 wt %.

The balance of the present molybdenum silicide based composition is $Mo_{1-x}Cr_xSi_2$. According to one embodiment, the composition as defined hereinabove or herein after comprises at least 90 weight % (wt %) $Mo_{1-x}Cr_xSi_2$, such as at least 92 wt % $Mo_{1-x}Cr_xSi_2$, such as at least 94 wt % $Mo_{1-x}Cr_xSi_2$. According to one embodiment, the composition as defined hereinabove or hereinafter comprises $Mo_{1-x}Cr_xSi_2$ in the range of from 92.94 to 98.99, such as 94.98 to 97.95. Further, according to the present disclosure, a portion (x) of the molybdenum of the molybdenum silicide is substituted with chromium wherein x is of from 0.05 to 0.25. The substitution will improve the oxidation resistance of the molybdenum silicide based composition as defined hereinabove or hereinafter in the temperature range 400-600° C. and thereby reduce the degradation. According to one embodiment, x is in the range of from 0.10 to 0.20, such as 0.15 to 0.20.

The molybdenum silicide based composition as defined hereinabove or hereinafter, comprises small amounts of alumina ($Al_2O_3$), also known as aluminium oxide. The addition of low amounts (0.01 to 0.06 wt %) of alumina has surprisingly shown to have a great impact on the resistance against pest (see the accompanying FIGURE). Pest oxidation mostly occurs after a furnace has been in operation during an extended period of time, thus it is not possible to discover pest until a furnace has been operated for several hours. The FIGURE displays different molybdenum silicide compositions and as can be seen from the FIGURE, the higher the growth rate of the non-wanted oxide, the higher is the inclination of the line. The molybdenum silicide based compositions according to the present disclosure have the lowest inclination and thereby the lowest oxide growth rate and have thereby an improved resistance against pest. According to one embodiment, the amount of $Al_2O_3$ is of from 0.02 to 0.05 wt %.

A heating element according to the present disclosure may be readily produced in various shapes and sizes and advantageously replacing existing heating elements in industrial furnaces. The heating elements or any other object comprising a molybdenum silicide based compound are manufactured by sintering the molybdenum silicide composition as defined hereinabove or hereinafter. The sintering may be performed in two steps. The first sintering takes place in inert atmosphere such as hydrogen, nitrogen or argon at a temperature range of from 1000 to 2000° C. and during a time range of from 20 to 240 minutes. During the second sintering process, the composition is heated in air at a temperature range of 1000 to 1600° C. during 1 to 20 minutes.

The present disclosure is further illustrated by the following non-limiting example:

Example

Mixtures of molybdenum, silicon and chromium powders were prepared and heated under argon atmosphere to form $MoSi_2$ and $Mo_{0.85}Cr_{0.15}Si_2$, respectively. The reaction products were ground to an average particle diameter of 5 μm. Silicide powder was subsequently mixed with 5 wt. % bentonite (Bentolite-L bought from BYK) and water, and in the case for $Mo_{0.85}Cr_{0.15}Si_2$, 0.02, 0.035, 0.05, 0.1 or 0.2 wt. % $Al_2O_3$ (AKP-30 bought from Sumitomo) was added, to form a paste for extrusion.

The obtained compositions were extruded into 9 mm diameter rods, which were subsequently dried and pre-sintered in hydrogen for 1 h at 1375° C. A final sintering, resistance heating in air to 1500° C. for 5 minutes, was performed to achieve full density.

Samples of each composition were ground to remove the protective $SiO_2$ scale which was formed during final sintering. Samples were placed individually on alumina sample holders to collect potential oxidation products and to include them in the weight measurements. The samples were placed in an electrical furnace heated to 450° C. employing FeCrAl heating elements and utilized with ceramic fiber insulation. Sample and holder were weighed to monitor individual weight changes as function of exposure time.

The result of the testing is shown in the accompanying FIGURE. Pest oxidation mostly occurs after an furnace has be operated for an extended time such as around 1000 h. Heating elements that are considered to be good should have a low growth rate of the non-wanted oxide and thereby a low weight change of the heating element. The larger the weight change is, the thicker oxidation will be formed and the greater is the risk for element failure. As can be seen from the FIGURE, the higher inclination of the lines, the higher is the oxide growth rate and the faster the heating element will be consumed.

The invention claimed is:

1. A molybdenum-silicide based composition comprising: $Al_2O_3$ and 1 to 7 wt. % bentonite and balance $Mo_{1-x}Cr_xSi_2$ and wherein x is 0.05-0.25, wherein $Al_2O_3$ is present in the amount of from 0.01 to 0.06 wt. %.

2. The molybdenum-silicide based composition according to claim 1, wherein the bentonite is present in the amount of 2 to 6 wt. %.

3. The molybdenum-silicide based composition according to claim 1, wherein the bentonite is present in the amount of 2 to 5 wt. %.

4. The molybdenum-silicide based composition according to claim 1, wherein x is 0.10 to 0.20.

5. The molybdenum-silicide composition according to claim 1, wherein x is 0.15 to 0.20.

6. The molybdenum-silicide composition according to claim 1, wherein $Al_2O_3$ is in the amount of from 0.02 to 0.05 wt. %.

7. A heating element comprising a sintered molybdenum-silicide based compound which has been manufactured from the molybdenum-silicide based composition according to claim 1.

8. A furnace comprising an object containing a sintered molybdenum-silicide based compound which has been manufactured from the molybdenum-silicide based composition according to claim 1.

9. The molybdenum-silicide based composition according to claim 2, wherein x is 0.10 to 0.20.

10. The molybdenum-silicide composition according to claim 9, wherein $Al_2O_3$ is in the amount of from 0.02 to 0.05 wt. %.

11. The molybdenum-silicide composition according to claim 2, wherein x is 0.15 to 0.20.

12. The molybdenum-silicide composition according to claim 3, wherein x is 0.15 to 0.20.

13. The molybdenum-silicide composition according to claim 12, wherein $Al_2O_3$ is in the amount of from 0.02 to 0.05 wt. %.

14. The molybdenum-silicide composition according to claim 3, wherein $Al_2O_3$ is in the amount of from 0.02 to 0.05 wt. %.

15. The molybdenum-silicide composition according to claim 4, wherein $Al_2O_3$ is in the amount of from 0.02 to 0.05 wt. %.

* * * * *